United States Patent [19]
Sällberg
[11] Patent Number: 4,888,232
[45] Date of Patent: Dec. 19, 1989

[54] ELECTRICALLY CONDUCTIVE BOARD

[75] Inventor: Michael E. R. Sällberg, Mölnbo, Sweden
[73] Assignee: Selcro Limited, London, United Kingdom

[21] Appl. No.: 58,929
[22] Filed: Jun. 5, 1987
[51] Int. Cl.[4] ............ B32B 7/02
[52] U.S. Cl. ............ 428/215; 428/219; 428/223; 428/319.1; 428/319.9; 428/424.8; 428/447; 428/452; 428/457; 428/511; 428/522
[58] Field of Search ............ 428/901, 463, 464, 512, 428/216, 219, 319.9

[56] References Cited

U.S. PATENT DOCUMENTS 4,031,313 6/1979 Franz et al. ............ 428/463
4,402,151 9/1983 Medow ............ 40/569

*Primary Examiner*—George F. Lesmes
*Assistant Examiner*—J. M. Gray
*Attorney, Agent, or Firm*—Kane, Dalsimer, Sullivan, Kurucz, Levy, Eisele & Richard

[57] ABSTRACT

Electrically conductive layered board for use with low-voltage electrical equipment provided with piercing connectors, preferably for display purposes, comprising at least one first thin metal foil, preferably aluminium applied to an electrically insulating layer, the insulating layer including a plastics material that is sufficiently pliable to allow the metal foil to be deformed and bent into said insulating layer when a connector is pressed through the metal foil into, and to be held by, the insulating layer, thus ensuring a large contact surface between said connector and said metal foil.

6 Claims, 1 Drawing Sheet

ELECTRICALLY CONDUCTIVE BOARD

In a preferred embodiment the electrically conductive layered board comprises, in turn, a film of polyvinyl chloride having a thickness corresponding to 8–22 g/m$^2$, a layer of adhesive amounting to 15–40 g/m$^2$, a first layer of aluminium foil having a thickness of 21–65 $\mu$m, a layer of adhesive corresponding to 2-5 g/m$^2$, a layer of tough paper of 80 - 140 g/m$^2$ or an equivalent rubber, a film of polyethene of 20–40 g/m$^2$, a layer of polyurethane or polystyrene foam being at least 2 mm thick and having a density of 20–90 kg/m$^3$, a second layer of aluminium foil having a thickness of 21–65 $\mu$m, a layer of adhesive of 2–5 g/m$^2$, a layer of tough paper of 80 - 140 g/m$^2$ or an equivalent rubber and a film of polyethene of 20–40 g/m$^2$. BRIEF DES

DESCRIPTION OF THE APPENDED DRAWINGS

FIG. 1

FIG. 1 shows a section through a board according to the invention.

FIG. 2

DESCRIPTION OF A PREFERRED EMBODIMENT OF THE INVENTION

Figure 1:
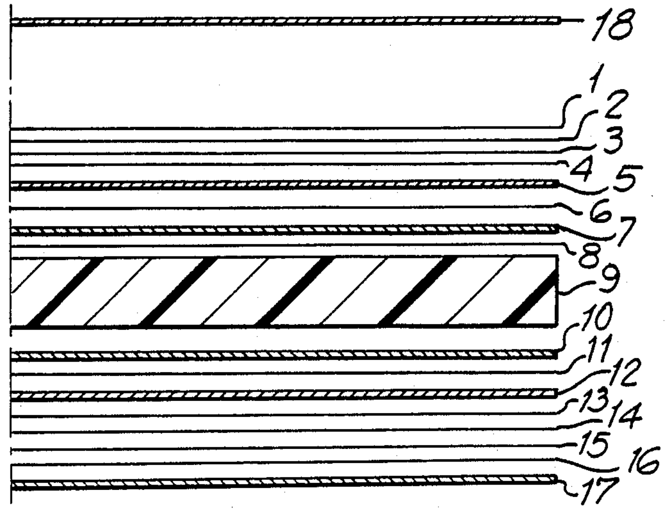

FIG. 1 shows a section through a board according to the invention consisting of seventeen different layers numbered 1–7. Layer 1 is a cover made of release-paper, e.g. silicone-treated paper having a thickness corresponding to 67 g/m$^2$, layer 2 consists of an adhesive applied in an amount corresponding to 30 g/m$^2$, layer 3 is a film of polyvinyl chloride corresponding to 15 g/m$^2$, layer 4 also consists of an adhesive applied in an amount corresponding to 30 g/m$^2$, layer 5, which is the electrically conductive layer, is a thin aluminium foil having a thickness of 40 $\mu$m, layer 6 is a layer of adhesive applied in an amount corresponding to 2–5 g/m$^2$, layer 7 is a tough paper having a thickness corresponding to 120 g/m$^2$, for instance corona-treated together with layer 8, layer 8 is a film of polyethene corresponding to 30 g/m$^2$, layer 9 is a comparatively thick layer of foamed polyurethane having a density of 40 kg/m$^3$ and and which forms the main body of the board, layer 10 is a second electrically conductive thin aluminium foil having a thickness of 40 $\mu$m, layer 11 is a layer of adhesive corresponding to 2–5 g/m$^2$, layer 12 is a second layer of touch paper of 120 g/m$^2$, layer 13 is a second film of polyethene corresponding to 30 g/m$^2$, layer 14 is another layer of adhesive corresponding to 30 g/m$^2$, layer 15 is a second layer of polyvinyl chloride corresponding to 15 g/m$^2$, layer 16 is a further layer of adhesive of 30 g/m$^2$ and layer 17 finally is a second layer of release-paper, e.g. silicone-treated treated paper of 67 g/m$^2$. The overall thickness of a board made to these specifications will be about 4,5 mm, which means that it easily will fit into standard display frames. The layers 1, 2 and 14–17 are entirely optional. The layers 1 and 2 serve for the attachment of maps or other pictures on the board and the layers 14-17 mainly serve either to attach the board to a wall or similar, or to attach a strengthening board or plate, or to attach another board made in accordance with the invention and thus making the board double sided. It should be noted that the board made according to the specification above is onesided, i.e. as described below, ensures a good contact when the connector is pushed through the board from the direction of layer 1 towards layer 17.

Figure 2:
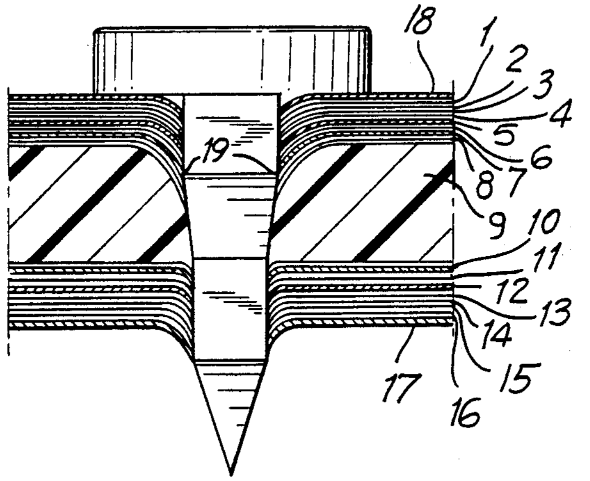
FIG. 2 shows a detail of the surface of the board in FIG. 1 when a connector has been pushed through this surface.

FIG. 2 illustrates the situation close to the surface of the board after a connector has been pushed into the board. 18 designates a map or similar mounted on the board. When the connector is pushed through the surface of the board the layers 1–7 and 18 all are bent into the board. Since the radius of curvature of the outer layers will be larger than that of the inner layers a part of the inner layers will be exposed, as can be seen in FIG. 2, see especially the part 19 of the aluminium foil 5. This exposed part 19 of the aluminium foil 5 will provide a comparatively large contact area with a conducting part 20 of the connector 21. This is a consequence of the pliable properties of the layer 9. The layer 7 of paper which is corona-treated together with the polyethene and thus comparatively tough, will on one hand contribute to the pliable properties of the insulating layer, which in this case consists of the layers 6–9, and on the other hand support and strengthen the aluminium foil so that it is not torn by the connector, thus ensuring that the parts of aluminium bent into the insulating layers remains in good electrical contact with the remainder of the aluminium foil. As stated above the outermost layer 18, the map, will not extend as far down into the hole pierced by the connector as the aluminium foil, thus ensuring that a part of the aluminium foil remains free to contact the connector. The film 3 of polyvinyl chloride will enhance this effect since it is elastic and when forced into the hole by the connector will tend to withdraw therefrom, together with the map attached to the polyvinyl chloride layer 3 by means of the adhesive 2, thus exposing more of the aluminium foil.

The other end of the connector 21, with the tip, will penetrate the second layer of aluminium and here a good contact is ensured by the fact that no material is carried into the pierced hole from the layer 9 of foamed polyurethane. The tough paper layer 12 will ensure that the aluminium foil is not torn when pierced by the connector and further ensures that the foil, that is bent along the connector, is pressed against the connector. This is illustrated in the lower part of FIG. 2.

Figure 3:
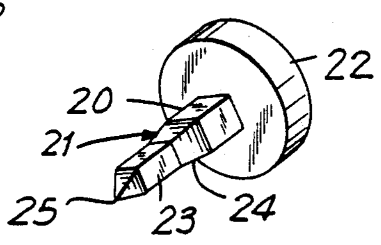
FIG. 3 shows a typical connector for use with a board according to the invention being associated with a light emitting diode. DETAILED

FIG. 3 finally shows a typical connector 21 associated with a light emitting diode 22. This connector 21 is formed as a pin and comprises a first and a second electrode 20, 23 being axially arranged in relation to each other and being separated by an insulating layer or part 24. The exposed surface of the first electrode 20 is spaced from the exposed surface of the second electrode 23 and is located at a distance therefrom that is sufficient to ensure that each electrode 20, 23 only comes into contact with one electrically conductive layer. The tip 25 may be a part of the second electrode 23. The insulating part or layer 24 is shown tapering towards the tip, but the connector can of course be designed with a constant cross-section along its entire length up to, but not including, the tip part. The electrodes of the connector do of course not have to be arranged coaxially, and can equally well each be arranged on a separate, pin-formed body.

This electrically conductive board allows an especially simple connection to an electrical supply source, in that the electricity simply is supplied by means of connectors inserted through the board, similar to the one shown in FIG. 3. This is possible even if an extremely low-tensioned system is used (for display purposes it is for instance desirable to be able to use light emitting diodes which work with a voltage of 1,5 volt or more). As discussed above, a low-voltage system of this kind, having a large number of light emitting diodes coupled in parallel, will entail a comparatively large amperage. The amperage at each diode may not be great but the current that has to be transmitted through the connectors from the electrical supply will be large. However, the contact area in a board designed according to the invention, when used with connectors of the above described piercing kind, will be quite sufficient to transmit this large current without any trouble. One simple and efficient way of transmitting power to the board is for instance to use a clamp provided with one or several connectors which is clamped around the edge of the board. As can be seen in FIG. 3, a connector for use with the board according to the invention, preferably is designed with a square or rectangular section and furthermore provided with a tip in the shape of a pyramid. This will ensure that the layers 1-8 and 10-13 will be cut into distinct flaps that are bent into the board thus minimizing the risk for tearing of the aluminium foil.

A further advantage of this is that an electrical current can be supplied to the board at any desired point, which per se of course is important, but which also means that the board can be cut into any desired shape, without any consideration having to be taken to any specially designed supply points.

Another important advantage is that, as discussed above, the board can be used in a low-voltage system. This means that the board and the system will be safe and easy to handle without risk for accidents due to high voltages.

As mentioned above the layers 1, 2 and 14-17 are entirely optional. The layers 1 and 2 only serve to secure a map or similar to the board and the map can of course be attached to the board in any other suitable way. The layers 15-17 can for instance be exchanged against the layer of polyvinyl chloride having a thickness corresponding to 100 g/m$^2$ or be exchanged against any other suitable substance. The layer 9 can of course be exchanged against any other material having similar properties as the illustrated polyurethane in regard of for instance weight, density, stability etc. as for instance polystyrene foam. Each or both pairs of the layers 7, 8 or 12, 13 can be replaced by a respective layer of rubber which will provide the same elastic properties as the polyethene film in respect of the withdrawing effect on a map or similar glued to the board which has been described above.

I claim:

1. Electrically conductive layer board for us with electrical equipment provided with piercing connectors for display purposes comprising:

(a) a film polyvinyl chloride having a thickness corresponding to 8-22 g/m$^2$ (b) a layer of adhesive amounting to 15-40 g/m$^2$.

(c) a first layer of aluminum having a thickness of 21-65 μm, (d) a layer of adhesive corresponding to 2-5 g/m$^2$.

(e) a layer of paper of 80-40 g/m$^2$, (f) a film of polyethylene of 20-40 g/m$^2$, (g) a layer of polyurethane foam being at least 2 mm thick and having a density of 20-90 kg/m$^3$, (h) a second layer of aluminum foil having a thickness of 21-65 μm, (i) a layer of adhesive amounting to 2-5 g/m$^2$, (j) a layer of paper of 80-140 g/m$^2$, (k) a film of polyethylene having a thickness corresponding to 20-40 g/m$^2$.

2. Electrically conductive layered board for use with electrical equipment provided with piercing connectors, for display purposes comprising:

(a) a film of polyvinyl chloride having a thickness corresponding to 15 g/m$^2$ (b) a layer of adhesive amounting to 30 g/m$^2$, (c) a first layer of aluminium having a thickness of 40 μm, (d) a layer of adhesive corresponding to 2-5 g/m$^2$, (e) a layer of paper of 120 g/m$^2$, (f) a film of polyethylene of 30 g/m$^2$, (g) a layer of polyurethane foam being 4 mm thick and having a density of 40 kg/m$^3$, (h) a second layer of aluminium foil having a thickness of 40 μm, (i) a layer of adhesive amounting to 2-5 g/m$^2$, (j) a layer of paper of 120 g/m$^2$, (k) a film of polyethene having a thickness corresponding to 30 g/m$^3$.

3. Board according to claim 2 further comprising an adhesive layer amounting to 30 g/m$^2$ on the side of the polyvinyl chloride opposite to the first aluminium foil which in turn is covered by a cover consisting of silicone-treated paper of 67 g/m$^2$.

4. Board according to claim 3 further comprising an adhesive layer amounting to 30 g/m$^2$ located on the side of the polyethene opposite to the second aluminium foil which in turn has a layer of polyvinyl chloride having a thickness corresponding to 15 g/m$^2$, a layer of adhesive amounting to 30 g/m$^2$ and a cover consisting of silicone - treated paper of 67 g/m$^2$.

5. Board according to claims 1 or 2 wherein one or both of said paper layers are replaced by a corresponding layer of rubber.

6. Board according to claims 1 or 2 wherein said layer of polyurethane is replaced by a layer of polystyrene foam.

* * * * *